(12) United States Patent
Choi et al.

(10) Patent No.: US 8,366,145 B2
(45) Date of Patent: Feb. 5, 2013

(54) CURTAIN AIRBAG CUSHION AND CURTAIN AIRBAG MODULE USING THE SAME

(75) Inventors: Jae Ho Choi, Seoul (KR); Hyeong Ho Choi, Gwangmyeong-si (KR); Seong Woo Lee, Suwon-si (KR); Jun Yeol Choi, Seoul (KR); Hyock In Kwon, Seongnam-si (KR); Soon Bok Lee, Yongin-si (KR); Hyong Sok Oh, Suwon-si (KR)

(73) Assignees: Hyundai Motor Company, Seoul (KR); Autoliv Development AB, Vargarda (SE)

( * ) Notice: Subject to any disclaimer, the term of this patent is extended or adjusted under 35 U.S.C. 154(b) by 141 days.

(21) Appl. No.: 12/956,273

(22) Filed: Nov. 30, 2010

(65) Prior Publication Data

US 2012/0043740 A1 Feb. 23, 2012

(30) Foreign Application Priority Data

Aug. 18, 2010 (KR) .................. 10-2010-0079769

(51) Int. Cl.
*B60R 21/232* (2011.01)
*B60R 21/233* (2006.01)

(52) U.S. Cl. ..................... 280/730.2; 280/729

(58) Field of Classification Search ............. 280/728.2, 280/729, 730.2
See application file for complete search history.

(56) References Cited

U.S. PATENT DOCUMENTS

| | | | | |
|---|---|---|---|---|
| 5,588,672 A * | 12/1996 | Karlow et al. | ............ | 280/730.2 |
| 6,155,596 A * | 12/2000 | Nakajima et al. | .......... | 280/730.2 |
| 6,361,069 B1 * | 3/2002 | Saito et al. | .................. | 280/730.2 |
| 6,371,512 B1 * | 4/2002 | Asano et al. | ................ | 280/730.2 |
| 6,386,578 B1 * | 5/2002 | Nanbu et al. | ................ | 280/730.2 |
| 6,394,487 B1 * | 5/2002 | Heudorfer et al. | ............ | 280/729 |
| 6,575,496 B2 * | 6/2003 | Hess et al. | .................. | 280/730.2 |
| 6,626,457 B2 * | 9/2003 | Masuda et al. | ............. | 280/728.2 |
| 6,709,010 B2 * | 3/2004 | Dominissini et al. | ...... | 280/730.2 |
| 6,758,492 B2 * | 7/2004 | Tesch | ......................... | 280/730.2 |
| 6,843,502 B2 * | 1/2005 | Aoki et al. | ................. | 280/730.2 |
| 6,932,386 B2 * | 8/2005 | Ikeda et al. | ................... | 280/739 |
| 6,971,665 B2 * | 12/2005 | Tanaka | ........................ | 280/729 |
| 7,172,212 B2 * | 2/2007 | Aoki et al. | ................. | 280/730.2 |
| 7,261,316 B1 * | 8/2007 | Salmo et al. | ............... | 280/730.2 |
| 7,264,269 B2 * | 9/2007 | Gu et al. | .................... | 280/730.2 |
| 7,267,364 B2 * | 9/2007 | Noguchi et al. | ........... | 280/730.2 |
| 7,325,826 B2 * | 2/2008 | Noguchi et al. | ........... | 280/730.2 |
| 7,556,286 B2 * | 7/2009 | Powals | ........................ | 280/730.2 |
| 7,618,056 B2 * | 11/2009 | Boxey | .......................... | 280/729 |
| 2001/0038197 A1 * | 11/2001 | Herzog | ....................... | 280/730.2 |
| 2002/0074779 A1 * | 6/2002 | Masuda et al. | ............. | 280/730.2 |
| 2003/0006588 A1 * | 1/2003 | Aoki et al. | ................. | 280/730.2 |
| 2004/0056456 A1 * | 3/2004 | Ikeda et al. | ................. | 280/730.2 |
| 2005/0006888 A1 * | 1/2005 | Yamanaka | ................. | 280/743.1 |
| 2005/0127644 A1 * | 6/2005 | Kino et al. | ................. | 280/730.2 |
| 2005/0127651 A1 * | 6/2005 | Blackburn | ................. | 280/743.1 |

(Continued)

*Primary Examiner* — Ruth Ilan
*Assistant Examiner* — Barry Gooden, Jr.
(74) *Attorney, Agent, or Firm* — Morgan, Lewis & Bockius LLP

(57) ABSTRACT

Disclosed herein is a curtain airbag cushion. The cushion has a length appropriate for being deployed to the chest of a passenger. A blocking part which partitions the interior of the cushion into portions is oriented in the vertical direction. The lower end of the blocking part is spaced apart from the bottom of the cushion by a predetermined distance. Thus, when an inflator explodes, gas discharged from the inflator is guided towards the lower portion of the cushion and then guided towards the front or upper portion of the cushion through the space between the lower end of the blocking part and the bottom of the cushion.

13 Claims, 3 Drawing Sheets

U.S. PATENT DOCUMENTS

| | | | |
|---|---|---|---|
| 2005/0189743 A1* | 9/2005 | Bakhsh et al. | 280/730.2 |
| 2005/0212270 A1* | 9/2005 | Wipasuramonton et al. | 280/730.2 |
| 2006/0061075 A1* | 3/2006 | Aoki et al. | 280/730.2 |
| 2006/0091662 A1* | 5/2006 | Tsujimoto et al. | 280/743.1 |
| 2006/0163849 A1* | 7/2006 | Keshavaraj | 280/730.2 |
| 2006/0163853 A1* | 7/2006 | Keshavaraj | 280/743.1 |
| 2006/0208466 A1* | 9/2006 | Kirby | 280/730.2 |
| 2007/0040368 A1* | 2/2007 | Manley | 280/743.2 |
| 2007/0052212 A1* | 3/2007 | Powals | 280/729 |
| 2007/0138778 A1* | 6/2007 | Takemura et al. | 280/743.1 |
| 2008/0197611 A1* | 8/2008 | Kabata | 280/730.2 |
| 2008/0238047 A1* | 10/2008 | Komiyama | 280/728.2 |
| 2008/0290634 A1* | 11/2008 | Sugimori et al. | 280/728.2 |
| 2009/0026742 A1* | 1/2009 | Noguchi et al. | 280/730.2 |
| 2009/0058049 A1* | 3/2009 | Villarreal et al. | 280/728.2 |
| 2009/0179405 A1* | 7/2009 | Steinbach et al. | 280/730.2 |
| 2010/0270781 A1* | 10/2010 | Abney et al. | 280/730.2 |
| 2011/0101658 A1* | 5/2011 | Konishi et al. | 280/730.2 |
| 2012/0098240 A1* | 4/2012 | Kato et al. | 280/730.2 |
| 2012/0119476 A1* | 5/2012 | Saiki et al. | 280/730.2 |

* cited by examiner

CURTAIN AIRBAG CUSHION AND CURTAIN AIRBAG MODULE USING THE SAME

CROSS-REFERENCE TO RELATED APPLICATIONS

The present application claims priority to Korean Patent Application No. 10-2010-0079769 filed on Aug. 18, 2010, the entire contents of which is incorporated herein for all purposes by this reference.

BACKGROUND OF THE INVENTION

1. Field of the Invention

The present invention relates to a curtain airbag cushion which is installed adjacent to a roof panel of a vehicle so that when the vehicle is involved in a collision, it is deployed downwards to protect a passenger, and a curtain airbag module using the curtain airbag cushion.

2. Description of Related Art

Curtain airbags and side airbags are representative examples of safety devices designed to handle side collisions of vehicles. Typically, a curtain airbag 30 is installed above an upper end of a window of a vehicle 10 at a position adjacent to a roof panel 12 by a cushion holder 32. The curtain airbag 30 is connected to an inflator 34. When the vehicle 10 is involved in a side collision, the curtain airbag 30 is deployed downwards to protect a passenger from the window and absorb impact generated by the passenger colliding against the side door of the vehicle. Meanwhile, a side airbag 50 is provided in a sidewall of a seat of the vehicle 10 or a filler panel and is connected to an inflator 52. When a side collision occurs, the side airbag 50 is deployed to protect the passenger from colliding with the side door.

The conventional curtain airbag 30 has a length appropriate to cover the window of the vehicle when it is deployed, thus protecting the head H of the passenger P from broken pieces of the window, and preventing the head of the passenger from colliding with the window. Furthermore, the side airbag 50 supports the shoulder S and the upper portion of the arm of the passenger when it is deployed, thus preventing the passenger from colliding with the door.

Recently, as a combination of these two airbags, curtain airbags which have extended lengths so that the chest of the passenger can be protected by a single curtain airbag have been developed. However, in the case of the curtain airbag having an extended length, the time it takes to completely deploy the lower end of the airbag after the inflator explodes is increased. Thus, the airbag may not reliably protect the chest of the passenger. In other words, due to the position of the inflator, the cushion inflates in a direction from the top to the bottom thereof. Therefore, the cushion protects the passenger in the sequence of the head first and then the chest. Thus, when a vehicle collision occurs, a large impact may be applied to the chest of the passenger before the cushion is completely deployed to protect the chest of the passenger. As such, in the conventional curtain airbag having the side airbag function, the upper portion and the lower portion of the cushion cannot be deployed at approximately the same time. As a result, the cushion cannot reliably protect the chest of the passenger.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a curtain airbag having an extended length such that a single airbag cushion can protect not only the head of a passenger but also his/her chest, and a lower portion of the cushion can be rapidly inflated so as to reliably and effectively protect the head and the chest of the passenger.

In an aspect of the present invention, the curtain airbag cushion, provided at a position adjacent to a roof panel of a vehicle by a cushion holder, the curtain airbag cushion being deployed downwards to protect a passenger by explosion of an inflator, may include the inflator connected to a portion of an upper end of the cushion, wherein the curtain airbag cushion may have a predetermined length such that the cushion may be deployed to a position at which the cushion covers a body of the passenger when the inflator explodes, and a blocking part formed in the cushion at a position adjacent to the inflator and extending in a predetermined length in a vertical direction to partition an interior of the cushion into a plurality of portions fluid-communicating each other, wherein the blocking part may have a lower end spaced apart from a lower end of the cushion by a predetermined distance to form a space, so that when the inflator explodes, gas may be guided towards a lower portion of the cushion by the blocking part and then guided towards an upper portion or a front portion of the cushion through the space.

The blocking part may have an upper end in contact with the upper end of the cushion so that the gas supplied from the inflator into the cushion may be guided downwards.

The blocking part may have an upper end spaced from the upper end of the cushion.

The lower end of the cushion may be curved so that the gas supplied from the inflator into the cushion may be easily guided from the lower portion of the cushion towards the front portion of the cushion.

A peripheral portion of the cushion adjacent to an upper portion of a safety belt of the vehicle may be depressed inwards to prevent the cushion from being impeded by the upper portion of the safety belt when the cushion may be deployed.

The blocking part may have a curved shape which may be convex in a direction opposite to the inflator.

The blocking part may include a plurality of blocking parts parallel to each other in a vertical direction of the cushion.

The blocking part may include a plurality of blocking parts, one of which may be adjacent to the inflator and oriented in the vertical direction and the others may be oriented in the vertical direction, in the forward and rearward direction or in a diagonal direction, wherein size of the plurality of blocking parts may be sequentially reduced in a direction opposite to the inflator.

The blocking part may be provided by adhering left and right opposite fabrics of the cushion to each other or by an OPW (one piece woven) method in a shape in which left and right opposite fabrics may be put in contact with each other, wherein the lower end of the blocking part may have a circular cross-section at a junction between the lower end of the blocking part and each of the left and right fabrics of the cushion.

The lower end of the blocking part may have a circular cross-section at a junction between the lower end of the blocking part and each of left and right sides of the cushion.

The upper end of the blocking part may have a circular cross-section at a junction between the upper end of the blocking part and each of left and right sides of the cushion.

The cushion has, with respect to a longitudinal direction of the vehicle, a length capable of protecting all passengers who sit on front and rear seats of the vehicle.

In another aspect of the present invention, the curtain airbag module, may include a cushion holder provided at a position adjacent to a roof panel of a vehicle, an inflator provided adjacent to the roof panel of the vehicle along with the cushion holder, a cushion fastened at an upper portion thereof to the vehicle by the cushion holder, a portion of an upper end of the cushion being connected to the inflator, the cushion having a predetermined length such that the cushion may be deployed to a position at which the cushion covers a body of a passenger when the inflator explodes, and a blocking part disposed in the cushion adjacent to the inflator and extending a predetermined length in a vertical direction to partition an interior of the cushion into portions, the blocking part having a lower end spaced apart from a lower end of the cushion by a predetermined distance to form a space, so that when the inflator explodes, gas may be guided towards a lower portion of the cushion by the blocking part and then guided towards an upper portion or a front portion of the cushion through the space.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
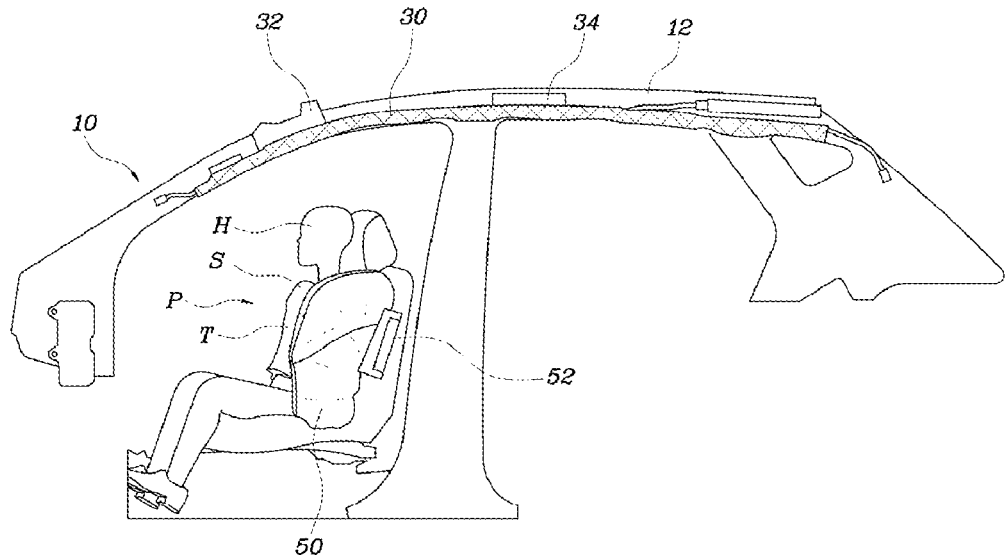
FIG. 1 is a view showing a curtain airbag and a side airbag, according to a conventional technique.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

BRIEF DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Hereinafter, a curtain airbag cushion and a curtain airbag module using the cushion according to embodiments of the present invention will be described in detail with reference to the attached drawings.

Figure 2:
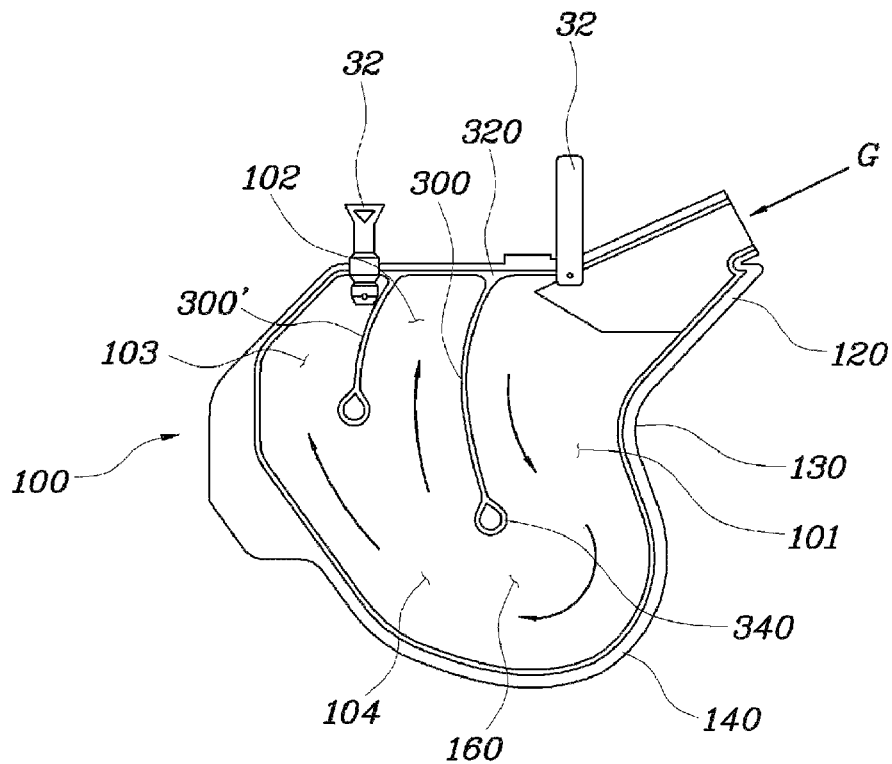
FIG. 2 is a perspective sectional view of a curtain airbag cushion, according to various exemplary embodiments of the present invention.

FIG. 2 is a perspective sectional view of a curtain airbag cushion, according to a first embodiment of the present invention, showing the curtain airbag cushion cut off in the longitudinal direction of a vehicle. The curtain airbag cushion of the present invention is installed at a position adjacent to a roof panel of the vehicle by a cushion holder. The curtain airbag cushion is deployed downwards by explosion of an inflator connected to a portion 120 of an upper end of the cushion, thus protecting a passenger P. The curtain airbag cushion has a length appropriate for deploying the cushion to a position at which the cushion can cover the body T of the passenger P when the inflator explodes. A blocking part 300 is disposed in the cushion 100 at a position adjacent to the inflator and extends a predetermined length in the vertical direction. The blocking part 300 partitions the interior of the cushion 100 into two portions, but a lower end of the blocking part 300 is spaced apart from the bottom of the inner surface of the cushion 100 by a predetermined distance to form a space 160. Thus, when the inflator explodes, gas G is guided towards the lower portion of the cushion 100 by the blocking part 300 and then guided towards the front or upper portion of the cushion 100 through the space 160. Here, the term "the body of the passenger" means a portion including the shoulders, the chest and the waist or the hip of the passenger, excluding the arms and the legs.

The portion 120 of the upper end of the cushion 100 is connected to the inflator. The upper end of the cushion 100 is fastened to the roof of the vehicle by the cushion holder 32. The cushion 100 is located in the roof side panel of the vehicle and is maintained in the folded state. When the vehicle is involved in a side collision, the cushion pushes the roof side panel and protrudes out of the roof side panel according to a sensing signal of a sensor and then is deployed downwards along the window into the shape of the sectional view of FIG. 2.

In detail, the upper portion of the cushion 100 is connected to the inflator. The length of the cushion 100 is longer than that of the conventional curtain airbag cushion, in other words, the cushion 100 extends downwards by a length that is long enough to protect the chest of the passenger. The blocking part 300 which partitions the interior of the cushion 100 extends in the vertical direction in the cushion 100. The lower end of the blocking part 300 is spaced apart from the bottom of the inner surface of the cushion 100 to form the space 160, so that when the inflator explodes, gas G is guided towards the lower portion of the cushion 100 by the blocking part 300 and then guided towards the front or upper portion of the cushion 100 through the space 160.

In an exemplary embodiment of the present invention, thanks to the blocking part 300 provided in the cushion 100, gas G supplied from the inflator in the cushion 100 can be rapidly transferred to the lower portion 140 of the cushion so that the cushion 100 can be rapidly deployed to the position corresponding not only to the head but also to the chest of the passenger, thus protecting the passenger more reliably.

Figure 3:
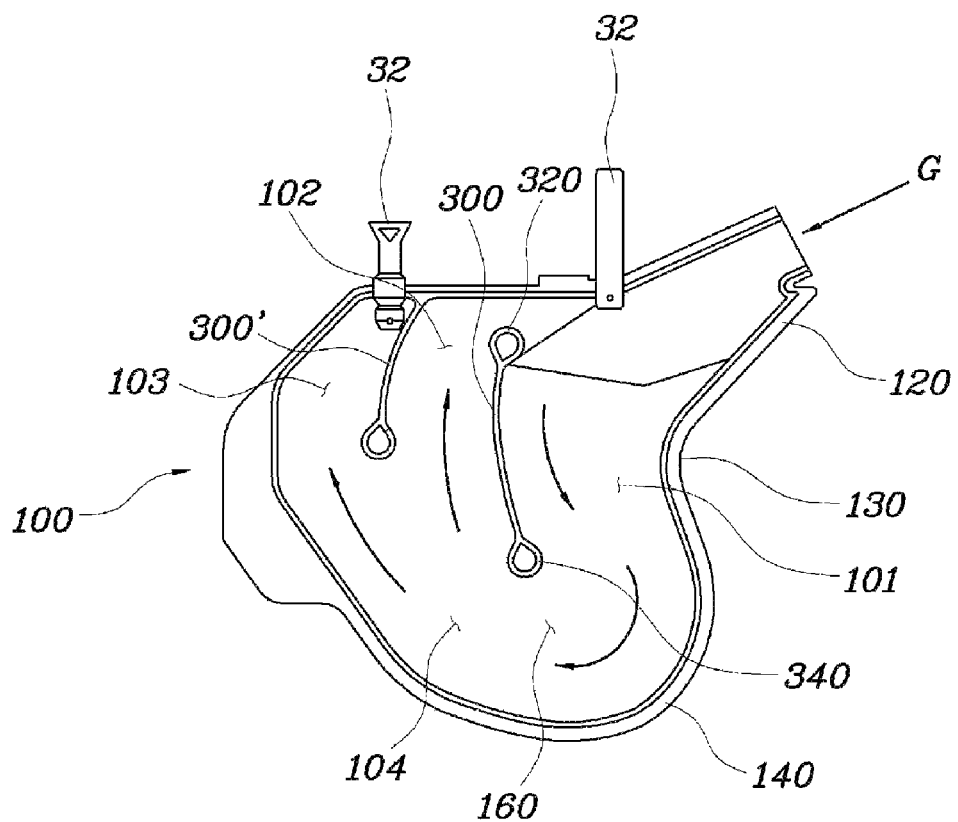
FIG. 3 is a perspective sectional view of a curtain airbag cushion, according to various exemplary embodiments of the present invention.

The blocking part 300 may be configured such that the upper end thereof is directly connected to the upper end of the cushion 100 so that gas G of the inflator is guided only towards the lower portion of the cushion 100. Alternatively, the blocking part 300 may be configured such that the upper end thereof is also spaced apart from the upper end of the cushion 100 by a predetermined distance so that gas is guided towards both the upper portion and the lower portion of the cushion 100. Typically, the head and the chest of the passenger are supported by a primary space 101 formed adjacent to the inflator. Therefore, it is desirable that the upper end 320 of the blocking part 300 be directly connected to the upper end of the cushion 100. According to the structure of the cushion 100, the end of the inflator may be located in the cushion 100. In this case, it is preferable that the end of the inflator does not make contact with the blocking part 300 so that a separate space can be prevented from being formed between the end of the inflator, the blocking part 300 and the inner surface of the cushion. FIG. 3 is a perspective sectional view of a curtain airbag cushion, according to a second embodiment of the present invention. In the second embodiment, the upper end of the blocking part 300 is spaced apart from the upper end of the cushion 100. In this case, it is desirable that the upper end 320 of the blocking part 300 make contact with the end of an air supply port of the inflator so that air supplied into the cushion can rapidly move downwards.

Meanwhile, the lower portion 140 of the cushion 100 has a curved shape such that gas G supplied from the inflator into the cushion 100 is smoothly guided forwards from the lower portion 140 of the cushion 100. To rapidly and smoothly guide gas forwards, the lower portion 140 of the cushion 100 is preferably curved in a "U" shape. Furthermore, the blocking part 300 may have a curved shape in which it is convex in the direction opposite to the inflator. In the case where the cushion 100 and the blocking part 300 have the above-mentioned shapes, gas G supplied from the inflator can be smoothly guided towards the front portion of the cushion 100. That is, gas G drawn into the cushion 100 is smoothly guided downwards along the curved surface of the blocking part 300, and the gas G guided downwards is smoothly guided forwards along the curved surface of the lower portion 140. Thereafter, the gas G is guided towards the front portion or the upper portion of the cushion through the space 160. As such, due to the curved shapes of the cushion 100 and the blocking part 300, gas G supplied from the inflator into the cushion 100 can more rapidly and smoothly flow in the cushion 100.

In addition, the cushion 100 is shaped such that a peripheral portion 130 adjacent to an upper portion 72 of a safety belt of the vehicle is depressed inwards to prevent the cushion 100 from being impeded by the upper portion 72 of the safety belt when it is deployed. In detail, in the case of the curtain airbag, the cushion 100 is located at the roof of the vehicle and deployed downwards along the window when the airbag inflates. Because the upper portion 72 of the safety belt is disposed on the path along which the cushion 100 is deployed, the bracket 72 unavoidably impedes the deployment of the cushion 100. To solve this problem, in an exemplary embodiment of the present invention, the peripheral portion 130 of the cushion 100 adjacent to the upper portion 72 of the safety belt is depressed inwards. Thus, when the cushion 100 is deployed, this deployment of the cushion 100 can be prevented from being impeded on by the bracket 72 or the safety belt 70. Therefore, the cushion 100 can be more rapidly and reliably deployed in the correct direction, thereby avoiding a problem in which the cushion 100 may move towards the head of the passenger because of the interference between the safety belt 70 and the cushion 100 and thus strike the head.

The blocking part 300 may include a plurality of blocking parts which are parallel to each other and are oriented in the vertical direction of the cushion 100. Alternatively, the blocking part 300 may include a plurality of blocking parts, of which one adjacent to the inflator is oriented in the vertical direction and the other is oriented in the vertical direction, in the forward and rearward direction or in a diagonal direction. The optimal shape of the blocking part 300 can be determined by analyzing the flow of air depending on the overall shape of the cushion. Preferably, in the exemplary embodiments shown in the drawings, two blocking parts 300 and 300' are oriented in the vertical direction and are parallel to each other. Furthermore, the front blocking part 300' is shorter than the rear blocking part 300. In the case where the blocking part 300 includes a plurality of blocking parts, the space in the cushion 100 is also partitioned into a plurality of portions. In the exemplary embodiments, the space in the cushion 100 is partitioned into a first space 101, a second space 102 and a third space 103 from the inflator side to the front portion of the cushion 100. The lower portions of the first, second and third spaces 101, 102 and 103 communicate with each other through a fourth space 104. As such, when the space in the cushion 100 is partitioned into three spaces, the spaces are consecutively inflated by gas G drawn thereinto through the fourth space 104. The space that is most important in terms of protecting the passenger is first rapidly inflated, thus increasing the effect of protection of the passenger. In detail, when the deployment process of the cushion 100 begins, gas G supplied from the inflator is blocked by the blocking part 300, so that the first space 101 is inflated first. When the deployment process of the cushion 100 is in the middle stages, the first space 101 is completely inflated, thus protecting the head and the chest of the passenger effectively. In the last stage of the deployment process of the cushion 100, all of the first, second and third spaces 101, 102 and 103 are completely inflated and cover the window.

The blocking part 300 may be provided by directly adhering the left and right opposite fabrics of the cushion 100 to each other. Alternatively, the blocking part 300 may be formed by an OPW (one piece woven) method in a shape in which the left and right opposite fabrics are in contact with each other. The blocking part 300 may have a shape of a partition wall or a shape in which the left and right fabrics are in direct contact with each other. If the blocking part 300 is shaped in such a way that the left and right fabrics are in direct contact with each other, it may be formed by weaving the two fabrics or by an OPW method by which the cushion 100 is formed of a single piece of fabric. It is preferable that a lower end 340 of the blocking part 300 have a circular cross-section at the junction between it and each of the left and right fabrics. Because high-pressure and high-temperature inflator gas passes through the space between the lower end 340 of the blocking part 300 and the lower portion 140 of the cushion 100, the lower end 340 of the blocking part 300 may be easily damaged, that is, the lower end 340 of the blocking part 300 may be damaged by high temperature and the cushion 100 may tear. To avoid this, the blocking part 300 has a circular cross-section at the junction between it and each of the left and right fabrics to disperse the stress focused on the lower end 340 and increase the coupling force between the left and right fabrics of the cushion 100.

Figure 4:
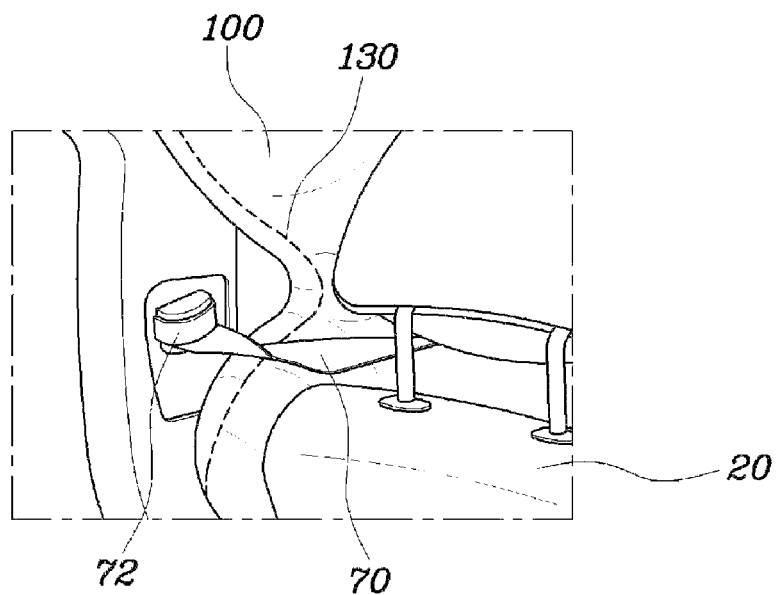
FIG. 4 is a perspective view showing a peripheral portion of the curtain airbag cushion of FIG. 2.

FIG. 4 is a perspective view showing the peripheral portion 130 of the curtain airbag cushion of FIG. 2. The peripheral portion 130 is a portion adjacent to the safety belt 70. As stated above, the upper portion 72 of the safety belt 70 may interfere with the curtain airbag cushion 100. To prevent this, in an exemplary embodiment of the present invention, the peripheral portion 130 of the cushion 100 adjacent to the upper portion 72 of the safety belt 70 is depressed inwards.

Figure 5:
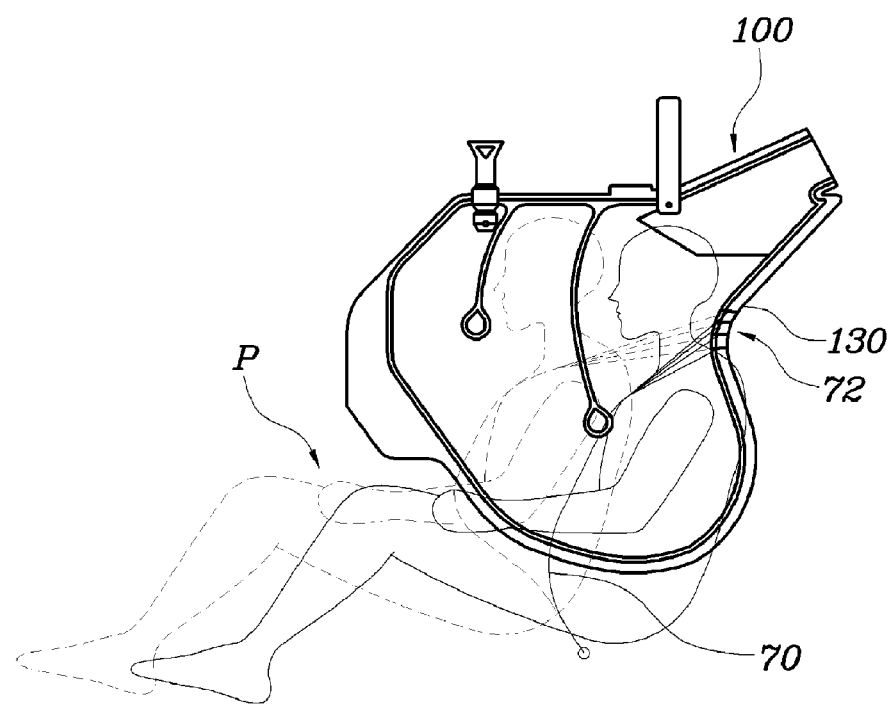
FIG. 5 is another perspective sectional view of the curtain airbag cushion of FIG. 2.

FIG. 5 is another perspective sectional view of the curtain airbag cushion of FIG. 2. When the cushion 100 is formed such that, as shown in FIG. 4, the peripheral portion 130 is depressed inwards, the moving of the vehicle seat with respect to the longitudinal direction of the vehicle and the moving of the upper portion 72 of the safety belt with respect to the vertical direction must be taken into account. FIG. 5 is an exemplary view showing the shape of the peripheral portion 130 of the cushion 100 which is depressed sufficiently inwards to prevent the peripheral portion 130 from interfering with the safety belt 70 and protect the head of the passenger.

Figure 6:
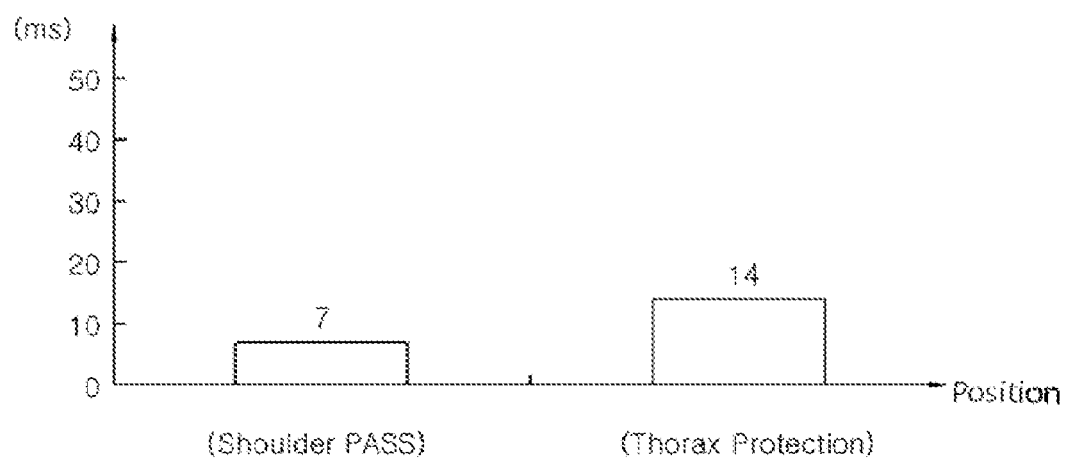
FIG. 6 is a graph showing deployment speed of the curtain airbag cushion of FIG. 2.

FIG. 6 is a graph showing deployment speed of the curtain airbag cushion of FIG. 2. The graph shows the result of a collision test involving a vehicle provided with the curtain airbag cushion of the present invention. As the results show, the time it takes the first space to inflate to the shoulders of the passenger is 7 ms when a side collision occurs. From this state, the time it takes the cushion to inflate to the chest of the passenger is 7 ms. Thus, the total time required for the inflation of the cushion is 14 ms. As such, the present invention can markedly reduce the time required for the deployment of the cushion, compared to the conventional curtain airbag which requires a deployment time ranging from 27 to 30 ms. This is possible because the first space has a longish shape in the vertical direction and is narrower than the conventional curtain airbag. Therefore, in the curtain airbag cushion of the present invention, the first space which is most important in terms of protection of the passenger can be rapidly inflated, and then the second and third spaces which are secondarily important can be inflated in order. Furthermore, although the vehicle has no side airbag, not only the head but also the chest of the passenger can be protected by the curtain airbag cushion of the present invention. Thus, the separate side airbag which has been required in the conventional technique can be omitted.

Meanwhile, a curtain airbag module using the curtain airbag cushion according to an exemplary embodiment of the present invention includes a cushion holder 32, an inflator, a cushion 100 and a blocking part 300. The cushion holder 32 is provided at a position adjacent to the roof panel of the vehicle. The inflator, along with the cushion holder 32, is installed adjacent to the roof panel of the vehicle. The upper portion of the cushion 100 is fastened to the vehicle body by the cushion holder 32. A portion of the upper end of the cushion is connected to the inflator. The curtain airbag cushion has an appropriate length such that the cushion is deployed to a position at which the cushion can cover the body T of the passenger when the inflator explodes. The blocking part 300 is disposed in the cushion 100 adjacent to the inflator and extends in the vertical direction to partition the interior of the cushion 100 into two portions. The lower end of the blocking part 300 is spaced apart from the lower portion 140 of the cushion 100 by a predetermined distance to form a space 160. Thus, when the inflator explodes, gas G is guided towards the lower portion of the cushion 100 by the blocking part 300 and then guided towards the front or upper portion of the cushion 100 through the space 160. In the curtain airbag module having the above-mentioned construction, the single inflator may be mounted on the central portion of the roof panel, and cushions may be provided at left and right sides of the inflator, that is, at sides adjacent to the front seats and the rear seats of the vehicle. In this case, the length of each cushion may be changed depending on the structure of the front or rear seat of the vehicle. Furthermore, according to circumstances, a single cushion having a length sufficient to protect all passengers of the front and rear seats may be provided.

As described above, in a curtain airbag cushion and a curtain airbag module using the same according to an exemplary embodiment of the present invention, a single curtain airbag cushion can protect not only the head of a passenger but also his/her chest.

Furthermore, the present invention improves the structure of a path along which gas flows through the cushion, so that the upper and lower portions of the cushion can be more rapidly deployed. Thereby, the cushion can more reliably protect the head and the chest of the passenger.

In addition, due to the improved shape of the cushion, gas discharged from an inflator can flow through the cushion more smoothly and rapidly.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A curtain airbag cushion, provided at a position adjacent to a roof panel of a vehicle by a cushion holder, the curtain airbag cushion being deployed downwards to protect a passenger by explosion of an inflator, comprising:
   the inflator connected to a portion of an upper end of the cushion, wherein the curtain airbag cushion has a predetermined length such that the cushion is deployed to a position at which the cushion covers a body of the passenger when the inflator explodes; and
   a blocking part formed in the cushion at a position adjacent to the inflator and extending in a predetermined length in a vertical direction to partition an interior of the cushion into a plurality of portions fluid-communicating with each other,
   wherein the blocking part has a lower end spaced apart from a lower end of the cushion by a predetermined distance to form a space, so that when the inflator explodes, gas is guided towards a lower portion of the cushion by the blocking part and then guided towards an upper portion or a front portion of the cushion through the space,
   wherein the blocking part comprises a plurality of blocking parts, one of which is adjacent to the inflator and oriented in the vertical direction and the others are oriented in the vertical direction, in a forward and rearward direction or in a diagonal direction, and
   wherein size of the plurality of blocking parts is sequentially reduced along an input direction of gas at the portion of the cushion connected to the inflator.

2. The curtain airbag cushion as set forth in claim 1, wherein the lower end of the cushion is curved so that the gas supplied from the inflator into the cushion is easily guided from the lower portion of the cushion towards the front portion of the cushion.

3. The curtain airbag cushion as set forth in claim 1, wherein a peripheral portion of the cushion adjacent to an upper portion of a safety belt of the vehicle is depressed inwards to prevent the cushion from being impeded by the upper portion of the safety belt when the cushion is deployed.

4. The curtain airbag cushion as set forth in claim 1, wherein the blocking part has a curved shape which is convex along the input direction of the gas at the portion of the cushion connected to the inflator.

5. The curtain airbag cushion as set forth in claim 1, wherein the blocking part comprises a plurality of blocking parts parallel to each other in the vertical direction of the cushion.

6. The curtain airbag cushion as set forth in claim 1, wherein the lower end of the blocking part has a circular cross-section at a junction between the lower end of the blocking part and each of a left side and a right side of the cushion.

7. The curtain airbag cushion as set forth in claim 1, wherein the cushion has, with respect to a longitudinal direction of the vehicle, a length capable of protecting all passengers who sit on front and rear seats of the vehicle.

8. The curtain airbag cushion as set forth in claim 1, wherein the blocking part has an upper end in contact with the upper end of the cushion so that the gas supplied from the inflator into the cushion is guided downwards.

9. The curtain airbag cushion as set forth in claim 8, wherein the upper end of the blocking part has a circular cross-section at a junction between the upper end of the blocking part and each of a left side and a right side of the cushion.

10. The curtain airbag cushion as set forth in claim 1, wherein the blocking part has an upper end spaced from the upper end of the cushion.

11. The curtain airbag cushion as set forth in claim 10, wherein the upper end of the blocking part has a circular cross-section at a junction between the upper end of the blocking part and each of a left side and a right side of the cushion.

12. The curtain airbag cushion as set forth in claim 1, wherein the blocking part is provided by adhering left and right opposite fabrics of the cushion to each other or by an OPW (one piece woven) method in a shape in which the left and right opposite fabrics are put in contact with each other.

13. The curtain airbag cushion as set forth in claim 12, wherein the lower end of the blocking part has a circular cross-section at a junction between the lower end of the blocking part and each of the left and right fabrics of the cushion.

* * * * *